United States Patent
Albert et al.

(10) Patent No.: US 9,352,845 B1
(45) Date of Patent: May 31, 2016

(54) BLADDERS, STORAGE CONTAINERS, AND AIRCRAFT FUEL SYSTEMS

(75) Inventors: Jeremie J. Albert, Philadelphia, PA (US); Martin G. Andrews, Chadds Ford, PA (US); Jason L. Firko, Wilmington, DE (US)

(73) Assignee: THE BOEING COMPANY, Chicago, IL (US)

( * ) Notice: Subject to any disclaimer, the term of this patent is extended or adjusted under 35 U.S.C. 154(b) by 769 days.

(21) Appl. No.: 13/370,129

(22) Filed: Feb. 9, 2012

(51) Int. Cl.
*B65D 88/18* (2006.01)
*B64D 37/06* (2006.01)
*B65D 88/24* (2006.01)

(52) U.S. Cl.
CPC ........................................ *B64D 37/06* (2013.01)

(58) Field of Classification Search
CPC ........................... A01B 12/006; B64D 37/06
USPC ................... 220/723, 721, 734, 563, 562, 720
See application file for complete search history.

(56) References Cited

U.S. PATENT DOCUMENTS

| | | | | |
|---|---|---|---|---|
| 4,580,990 A | * | 4/1986 | Avery | 446/46 |
| 4,610,369 A | * | 9/1986 | Mercier | 220/721 |
| 5,371,935 A | * | 12/1994 | Furs et al. | 29/426.2 |
| 5,515,997 A | * | 5/1996 | Kirk et al. | 220/562 |
| 6,298,961 B1 | * | 10/2001 | Hageman et al. | 188/352 |
| 6,308,857 B1 | * | 10/2001 | Heimbach et al. | 220/592 |
| 6,616,007 B2 | * | 9/2003 | Ishikawa et al. | 220/562 |
| 7,255,190 B1 | * | 8/2007 | Floro | 180/219 |
| 7,341,047 B2 | | 3/2008 | Sone et al. | |
| 7,832,590 B2 | * | 11/2010 | Smith et al. | 220/721 |
| 2006/0011173 A1 | * | 1/2006 | Davis et al. | 123/520 |
| 2008/0237239 A1 | * | 10/2008 | Pham et al. | 220/495.06 |
| 2013/0263967 A1 | * | 10/2013 | Woodruff | 141/1 |
| 2013/0306628 A1 | * | 11/2013 | Aso | 220/4.14 |

OTHER PUBLICATIONS http://www.aliexpress.com/product-gs/242280968-gasoline-bladder-wholesalers.html.
http://www.atlinc.com/pdfs/NewsReleases/images/ATL-500-gal-FueLocker-web.jpg.

* cited by examiner

*Primary Examiner* — J. Gregory Pickett
*Assistant Examiner* — Niki Eloshway
(74) *Attorney, Agent, or Firm* — Parsons Behle & Latimer

(57) ABSTRACT

A storage container, which may be a fuel bladder, includes a container wall configured to retain a fluid within the container and an opening through the container wall. The container includes a rim of the container wall surrounding the opening and a non-planar flex region of the container wall adjacent to the rim. The flex region includes at least one resilient crease in the container wall and the rim is between the flex region and the opening. A portion of the container wall surrounds the flex region. The flex region exhibits the property of allowing movement of the rim with respect to the portion of the container wall.

24 Claims, 3 Drawing Sheets

BLADDERS, STORAGE CONTAINERS, AND AIRCRAFT FUEL SYSTEMS

FEDERALLY SPONSORED RESEARCH OR DEVELOPMENT

This invention was made with Government support under Contract No. F34601-01-C-0026 awarded by the Air Force. The Government has certain rights in this invention.

TECHNICAL FIELD

The embodiments pertain to storage containers, including bladders, such as fuel bladders in aircraft fuel systems.

BACKGROUND

Fuel bladders in an aircraft, either as the primary source of fuel for the aircraft or as a fuel re-supply system, such as in a tanker, are installed as a secondary system held in place by lacing. A variety of interconnects may attach to the bladder. Examples of interconnects include fuel lines, fill ports, access ports, vents, and cell leveling ports allowing flow between cells of a fuel bladder.

To facilitate connection of an interconnect to a fuel bladder, a rigid metal, such as aluminum, interconnect ring is bonded and clamped onto a flat section of bladder material. The bladder material has a central opening. An opening through the interconnect ring is aligned with the central opening. Excess bladder material surrounding the ring may function as a flange for bonding the assembly to a fuel bladder over an opening through a wall of the fuel bladder. The assembly allows access into the fuel bladder through the interconnect ring. The interconnect ring is connected to the interconnect which is, in turn, anchored into the fuselage structure of the aircraft.

The interconnect anchors may be rigid in nature compared to the flexibility of some fuel bladders. Movement of the fuel bladder can apply a load to the interconnect and/or a back-up structure providing support for the interconnect. Also, while sufficiently low manufacturing tolerances may allow proper fit of a bladder, slightly undersized measurement may create installation difficulty and apply a load to the interconnect. The applied loads can cause failures leading to fuel leaks and costly repairs. It is possible to improve aircraft having fuel bladders to avoid damage to interconnects and/or fuel bladders resulting from fuel bladder movement.

SUMMARY

According to one embodiment, a fuel bladder includes a bladder wall configured to retain a fluid within the bladder and an opening through the bladder wall. The bladder includes a rim of the bladder wall surrounding the opening and a non-planar flex region of the bladder wall adjacent to the rim. The flex region includes at least one resilient crease in the bladder wall and the rim is between the flex region and the opening. A portion of the bladder wall surrounds the flex region. The flex region exhibits the property of allowing movement of the rim with respect to the portion of the bladder wall.

According to another embodiment, a storage container includes a container wall configured to retain a fluid within the container and an orifice through the container wall. The storage container includes a plurality of resilient, concentric corrugations in the container wall adjacent to the orifice. Individual corrugations continuously surround the orifice. A portion of the container wall surrounds the plurality of corrugations and is substantially co-planar with the orifice. The plurality of corrugations exhibit the property of allowing translational movement of the orifice with respect to the surrounding portion of the container wall.

According to a further embodiment, an aircraft fuel system includes an aircraft fuel housing, a fuel bladder inside the housing, and a rigid interconnect extending from the housing to the bladder. The bladder includes a bladder wall configured to retain fuel within the bladder. The housing has an interior profile and the bladder wall is configured to correspond with the interior profile. The bladder includes an opening through the bladder wall and a rim of the bladder wall surrounding the opening. An interconnect mount is attached to the rim, the mount attaching the housing interconnect to the bladder. The bladder includes at least one resilient, ring-shaped corrugation in the bladder wall adjacent to and continuously surrounding the rim. A portion of the bladder wall surrounds the corrugation, the corrugation exhibiting the property of allowing movement of the rim with respect to the surrounding portion of the bladder wall.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

Some embodiments are described below with reference to the following accompanying drawings.

DETAILED DESCRIPTION

Figure 1:
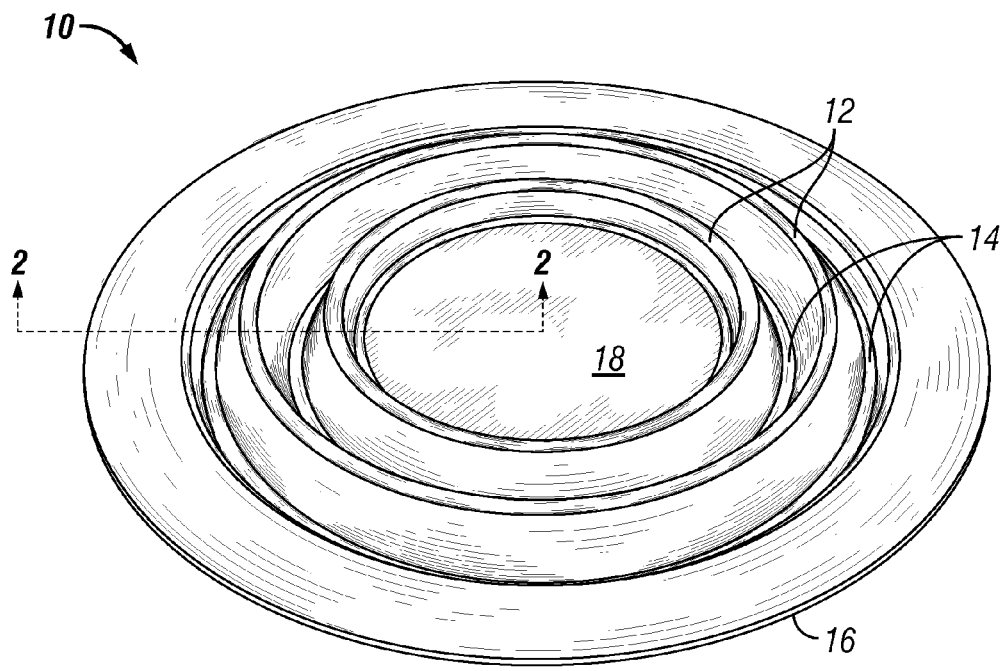
FIG. 1 is a view of a section of a container according to one embodiment.

In an aircraft fuel system, a fuel bladder may have a variety of configurations. The bladder may be inside a fuel housing. Some bladders may be oversized or fit loosely within its compartment inside the housing while others are configured to correspond with an interior profile of the housing. Some specifications for aircraft may be designed to reduce the possibility of folding in the bladder walls due to excess material and thus are configured to correspond more closely with the interior profile. However, since less excess material exists to allow for movement of the bladder with respect to interconnects, increased loads might be placed on the interconnects and their back-up structure, as well as on the bladder material itself. Since damage to the interconnect, back-up structure, or bladder material may result, embodiments herein allow reduction of the load.

Given the presence of a known load, an approach taken by those of ordinary skill would normally include strengthening the structures under the load to avoid damage. Embodiments herein take an alternative approach of isolating or reducing the load on the interconnects. The embodiments allow the designed use of excess bladder material in selected locations near interconnects so as to provide greater flexibility while still allowing bladders to be configured to correspond with an interior profile of a fuel housing. Thus, a bladder may exhibit a close fit within its compartment in the fuel housing, but still be flexible in a region proximate an interconnect to reduce or isolate loads resulting from gravitational forces and/or movement of the bladder.

Such an approach may be considered counter-intuitive since a connection between the bladder and the interconnect is weakened to reduce load instead of enhancing bladder or interconnect strength sufficient to handle an expected load. Accordingly, if a separate design criteria exists for an interconnect to bear a specified load, for example, to secure a fuel bladder, consideration may be made whether embodiments herein are appropriate to such circumstances.

An additional advantage of the embodiments includes potentially increasing tolerances for spacing between openings through the bladder wall for interconnects. That is, additional flexibility may be introduced into the bladder wall at select points. Accordingly, the embodiments herein may make less consequential possible variances in desired locations for such openings. If the location for an opening is slightly off, then appropriate connections with interconnects may nonetheless be allowed by the designs described herein.

In one embodiment, a fuel bladder includes a bladder wall configured to retain a fluid within the bladder. The bladder includes an opening through the bladder wall and a rim of the bladder wall surrounding the opening. A non-planar flex region of the bladder wall is adjacent the rim. The flex region includes at least one resilient crease in the bladder wall and the rim is between the flex region and the opening. A portion of the bladder wall surrounds the flex region, the flex region exhibiting the property of allowing movement of the rim with respect to the portion of the bladder wall.

By way of example, the bladder wall may be configured to retain a liquid aircraft fuel within the bladder. Although not discussed in detail herein, it is conceivable that the embodiments may be adapted for use with other types of fuel, including gas instead of liquid. The bladder may be comprised by an aircraft fuel system that further comprises an aircraft fuel housing and a rigid interconnect extending from the housing to the rim of the bladder wall. The interconnect may be selected from among a fuel line, a fill port, an access port, a vent, and a cell leveling port. The rim of the bladder wall surrounding the opening may be planar.

Also, the bladder may further include a ring-shaped interconnect mount attached to the rim. The mount may be configured to attach the housing interconnect to the bladder. Consequently, a rim being planar may facilitate attachment of a ring-shaped interconnect mount. The rim, the mount, and the at least one resilient crease in the bladder wall may be circular. Further, the at least one resilient crease may include a plurality of resilient, concentric corrugations. The at least one resilient crease may continuously surround the rim. The portion of the bladder wall surrounding the flex region may be substantially co-planar with the rim when no force is applied to the rim. That is, the nominal, relative position of the rim and the portion of the bladder wall includes them being substantially co-planar. Some limited amount of offset in planarity may be acceptable, as understood by those of ordinary skill, in light of the explanation below.

Examples of configurations for a flex region are shown in FIGS. 1-4. FIG. 1 shows a section 10 of a container wall, such as a bladder wall, with structures that provide a flex region. In section 10, alternate ridges 12 and furrows 14 form a plurality of corrugations. The corrugations extend between a flange 16 of bladder material surrounding the plurality of corrugations to a panel 18 surrounded by the corrugations. Section 10 may be considered to represent merely a partial view of a container wall or a separate apparatus configured for attachment to a container wall. That is, ridges 12 and furrows 14 may be integrally formed in a container wall of the same material as the container wall with no seams between any of the structures shown and the remainder of the container wall. Alternatively, flange 16 may be relied on as excess material for bonding section 10 at an opening through the container wall.

Figure 2:
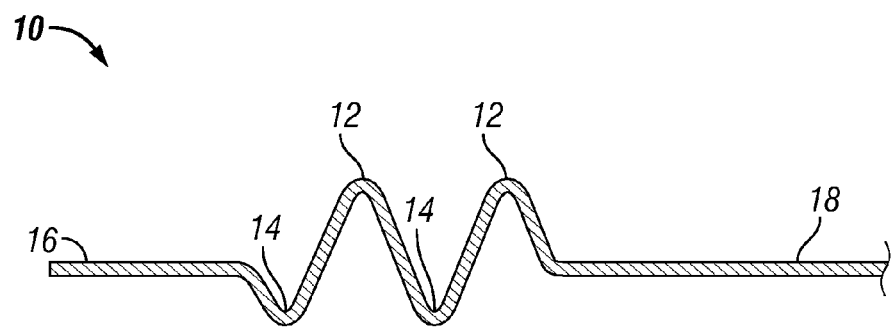
FIG. 2 is a partial cross-sectional view of the section in FIG. 1 taken along line 2-2.

FIG. 2 shows a cross-sectional view of a portion of section 10 taken along line 2-2 shown in FIG. 1. The alternate ridges 12 and furrows 14 are apparent in FIG. 2. Although both ridges 12 and furrows 14 are shown concentric, it is conceivable that a variety of geometric forms are possible and may be adapted to meet specifications of a variety of applications. Circular corrugations may allow the greatest degree of variation in movement, but other geometric forms might be configured to allow greater movement in a selected direction and lesser movement in another direction. The height/depth of the ridges/furrows may be selected to provide a desired extent of movement. Higher ridges and deeper furrows may tend to allow more extensive movement of panel 18 with respect to flange 16. Similarly, more corrugations may allow a greater extent of movement. An opening may be formed through panel 18 of desired size and shape to correspond with a selected interconnect mount. Accordingly, the embodiments may be adapted and optimized for a certain application with desired manufacturability and load reduction.

Even though the embodiments herein arose from solutions related to aircraft fuel bladders, those of ordinary skill will appreciate that embodiments herein may be adapted to a variety of storage containers where movement of an orifice with respect to a container wall is desired. Accordingly, in an embodiment a storage container includes a container wall configured to retain a fluid within the container. The container includes an orifice through the container wall and a plurality of resilient, concentric corrugations in the container wall adjacent the orifice. Individual corrugations continuously surround the orifice. A portion of the container wall surrounds the plurality of corrugations and is substantially co-planar with the orifice. The plurality of corrugations exhibit the property of allowing translational movement of the orifice with respect to the surrounding portion of the container wall.

By way of example, the container may be a bladder and the bladder may be configured to retain a liquid aircraft fuel within the bladder. The container may be comprised by an aircraft fuel system. Also, the corrugations may be circular.

Figure 3:
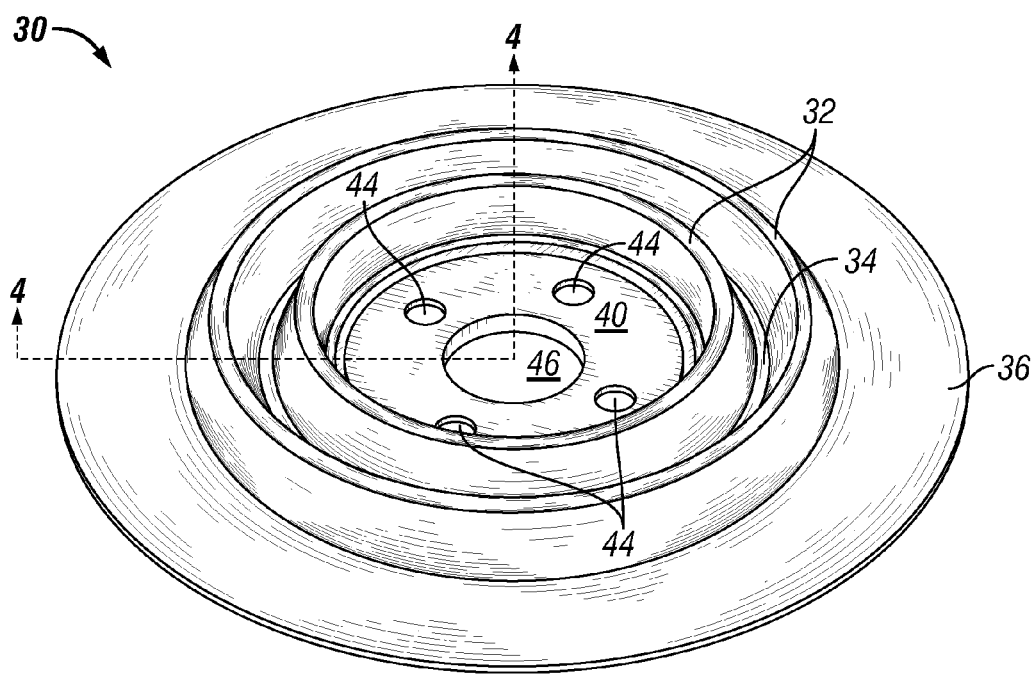
FIG. 3 is a view of another section of a container according to another embodiment.
Figure 4:
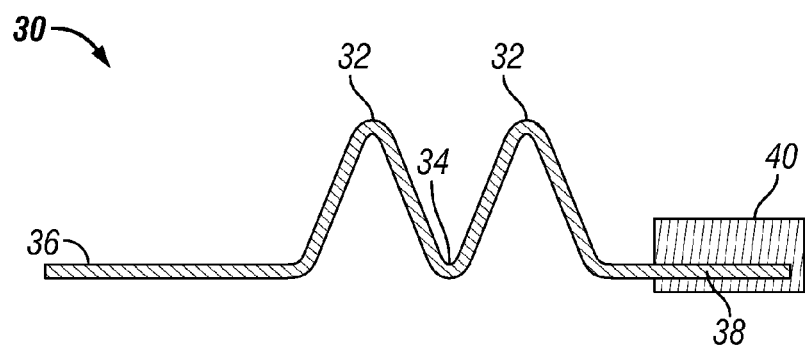
FIG. 4 is a partial cross-sectional view of the section in FIG. 3 taken along line 4-4.

FIGS. 3 and 4 show a section 30 of a container wall that includes ridges 32 and a furrow 34 between ridges 32. As with FIGS. 1 and 2, section 30 has a flange 36 that may represent an integral portion of the container wall or a region for bonding section 30 to a container wall at an opening therethrough. Section 30 provides a rim 38 whereon a mount 40 is attached to section 30. Mount 40 may provide an interconnect mount for attaching an interconnect to the container wall. An opening 46 is provided through mount 40 and rim 38. Fastener holes 44 facilitate attachment of mount 40 to an interconnect. Mount 40 in FIGS. 1 and 2 is shown as a circular ring, however, other ring geometries and structures other than rings may be used, depending on the appropriate configuration for a selected interconnect.

While the alternate ridges 12 and furrows 14 and alternate ridges 32 and furrow 34 provide corrugations, it is conceivable that a single crease may be used instead. Also, multiple creases might not be arranged to provide alternate ridges and furrows. In either circumstance, or other circumstances, a non-planar flex region may gather wall material into a resilient structure. Then, such gathers (corrugations or creases)

may elastically flatten and return to their former shape, allowing movement in various directions of the rim or orifice with which they are associated. The movement may most often be translational in the context of a fuel bladder, but some limited rotational movement is also possible. In addition, the creases might not continuously surround the rim or orifice.

Wall material might be formed of an elastomer and, thus, have inherent elastic properties. However, other materials, including plastic (or inelastic) materials, may be used for the wall. The structures present in the embodiments might be formed by molding the wall material or by other known methods.

The embodiments allow for elastic movement beyond the inherent elasticity, if any, of the wall material itself. Also, given limits in the extent of material elasticity, undesired loading to interconnects could still occur. The embodiments provide a structural elasticity enabled by a transitory change in the structural form. The change could be described as an elastic deformation. The change in form may allow both a greater extent of movement and less loading compared to reliance on material elasticity. In other words, the corrugations may extend fully to the point where no more corrugations exist and loading of the wall material begins.

A wall section that includes the structural features of the embodiments could be of the same material as the remainder of the wall or it could be different. A different material for the wall section may allow even greater extents of relief in loading on interconnects. For example, aircraft fuel bladders are often made from elastomer coated fabrics and it may be advantageous to form load-reducing wall sections from a material less-suited for the wall, but more-suited for the wall section embodiments herein.

The corrugations or flex region may be described as exhibiting a surface length along a radius from a center of the respective orifice or opening. The surface length is the length measured along the surface. In other words, the surface length is measured with all of the creases, ridges, and/or furrows flattened or extended fully. In FIGS. 1-4, the surface length is greater than an aerial length along the same radius from the center of panel 18 or opening 46. Comparison of the surface length and the aerial length helps to characterize the geometry of the creases. A greater surface length compared to the aerial length, allows a greater extent of movement. For example, the surface length between two points along the radius could be as much as 2 centimeters greater than the aerial length between the two points or it could be more than 2 cm.

In an embodiment, an aircraft fuel system includes an aircraft fuel housing and a fuel bladder inside the housing. The system includes a rigid interconnect extending from the housing to the bladder and the bladder includes a bladder wall configured to retain fuel within the bladder. The housing has an interior profile and the bladder wall is configured to correspond with the interior profile. The bladder includes an opening through the bladder wall and a rim of the bladder wall surrounding the opening. An interconnect mount is attached to the rim, the mount in turn attaching the interconnect to the bladder. At least one resilient, ring-shaped corrugation in the bladder wall is adjacent to and continuously surrounds the rim. A portion of the bladder wall surrounds the corrugation. The corrugation exhibits the property of allowing movement of the rim with respect to the surrounding portion of the bladder wall. By way of example, the mount may be a circular ring. Also, the at least one resilient corrugation may include a plurality of concentric corrugations.

In circumstances where the portion of the bladder wall is substantially co-planar with the rim, the movement-enabling features described herein may be accommodated inside an existing fuel housing without altering dimensions of an existing fuel bladder. That is, as apparent at least from FIGS. 3 and 4, mount 40 would remain in the same position relative to an aircraft fuel housing even though ridges 32 and furrow 34 are added to the bladder wall. That is, rim 38 and flange 36 are substantially co-planar, as they would be in the absence of ridges 32 and furrow 34. Consequently, embodiments herein may be equally applicable to new fuel bladders and retrofitting kits for existing fuel bladders. A section of bladder wall, such as section 10, section 30, or others in keeping with the embodiments could be added to an existing fuel bladder or like storage container.

Figure 5:
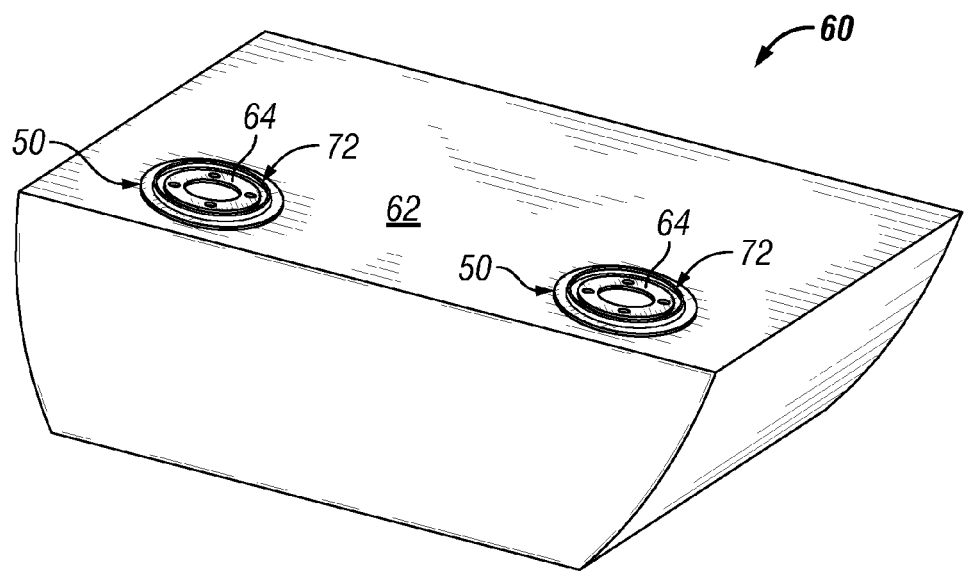
FIG. 5 is a view of a fuel bladder.
Figure 6:
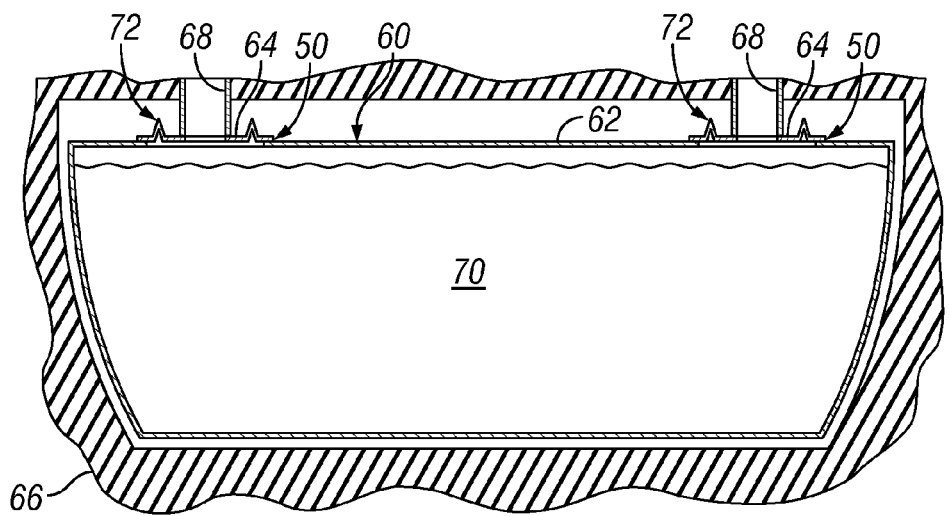
FIG. 6 is a cross-sectional view of the fuel bladder in FIG. 5 installed in an aircraft fuel housing.

FIG. 5 shows a bladder 60 including a bladder wall 62 with sections 50 of the bladder wall attached thereto. Mounts 64 are also shown attached to sections 50. Mount 64 is attached to a rim adjacent at least one resilient crease in flex region 72 in a portion of section 50. As shown in FIG. 6, bladder 60 may be inside a housing 66. Interconnects 68 may connect housing 66 to bladder 60 at mounts 64. A fuel 70 may be provided inside bladder 60. It will be appreciated that as a level of fuel 70 changes in bladder 60, bladder wall 62 may sag, increasing a load on interconnects 68. With the inclusion of embodiments herein, loads on interconnect 68 in FIG. 6 may be reduced. Notably, interconnects on the upper side of a bladder, as shown, may present the greatest likelihood of loading since gravity pulls down on the interconnects.

Embodiments herein may provide increasing benefit with increases in bladder size. The greater the bladder in size, the greater the potential for loads on interconnects as the bladder sags. Also, a position of a bladder in an aircraft and the type of aircraft may affect the level of benefit. Greater benefit may exist for greater gravitational loading in certain aircraft positions and types of aircraft. Accordingly, the greatest benefit may exist for large bladders that endure high gravitational loading, while the least benefit may accompany small bladders that undergo less gravitational loading. Interconnects that exhibit less structural ability to distribute an applied load also stand to benefit more significantly than those specifically designed to distribute applied loads. However, even high-load interconnects would not reduce the potential for damage to the fuel bladder at connection points with the interconnects.

In compliance with the statute, the embodiments have been described in language more or less specific as to structural and methodical features. It is to be understood, however, that the embodiments are not limited to the specific features shown and described. The embodiments are, therefore, claimed in any of their forms or modifications within the proper scope of the appended claims appropriately interpreted in accordance with the doctrine of equivalents.

TABLE OF REFERENCE NUMERALS FOR FIGURES 10 section
12 ridge
14 furrow
16 flange
18 panel
30 section
32 ridge
34 furrow
36 flange
38 rim
40 mount
44 fastener holes
46 opening
50 section 60 bladder
62 bladder wall
64 mount
66 housing
68 interconnect
70 fuel
72 flex region

The invention claimed is:

1. A fuel bladder comprising:
   two sections co-planar with one another; and
   a non-planar flex region separating the two co-planar sections and exhibiting the property of allowing movement of the bladder relative to an external bladder attachment, the two co-planar sections and the non-planar flex region being directly connected to one another or integrally formed, the two co-planar sections and the non-planar flex region containing the same material, and the non-planar flex region extending radially between the two co-planar sections of the fuel bladder,
   wherein the fuel bladder is comprised by an aircraft fuel system.

2. The fuel bladder of claim 1, wherein the two co-planar sections are non-contiguous.

3. The fuel bladder of claim 1, wherein one of the two co-planar sections is concentric to the other.

4. The fuel bladder of claim 1, wherein the flex region includes a plurality of concentric corrugations.

5. A fuel bladder comprising:
   a bladder wall configured to retain a fluid within the bladder;
   an opening through the bladder wall;
   a rim of the bladder wall surrounding the opening, the rim being configured to attach an interconnect to the bladder wall;
   a non-planar flex region of the bladder wall adjacent the rim, the flex region including at least one resilient crease in the bladder wall and the rim being between the flex region and the opening; and
   a portion of the bladder wall surrounding the flex region and being substantially co-planar with the opening when no force is applied to the rim, the flex region exhibiting the property of allowing movement of the rim with respect to the portion of the bladder wall and the flex region extending radially from the rim to the portion of the bladder wall.

6. The bladder of claim 5 wherein the bladder wall is configured to retain a liquid aircraft fuel within the bladder.

7. The bladder of claim 5 wherein the bladder is comprised by an aircraft fuel system that further comprises an aircraft fuel housing and a rigid interconnect extending from the housing to the rim.

8. The bladder of claim 7 wherein the rigid interconnect is axially aligned with the opening, the interconnect extending orthogonally from the opening.

9. The bladder of claim 5 wherein the rim is planar, the rim being substantially co-planar with the portion of the bladder wall when no force is applied to the rim.

10. The bladder of claim 5 further comprising a ring-shaped interconnect mount attached to the rim, the mount being configured to attach a housing an interconnect to the bladder wall.

11. The bladder of claim 10 wherein the rim, the mount, and the crease are circular.

12. The bladder of claim 5 wherein the flex region exhibits a surface length along a radius from a center of the opening that is greater than its aerial length along the radius.

13. The bladder of claim 5 wherein the at least one resilient crease comprises a plurality of resilient, concentric corrugations.

14. The bladder of claim 5 wherein the at least one resilient crease continuously surrounds the rim.

15. A fuel bladder comprising:
   a bladder wall configured to retain a fluid within the bladder;
   an opening through the bladder wall;
   a rim of the bladder wall surrounding the opening;
   a non-planar flex region of the bladder wall adjacent the rim, the flex region including at least one resilient crease in the bladder wall and the rim being between the flex region and the opening; and
   a portion of the bladder wall surrounding the flex region, the flex region exhibiting the property of allowing movement of the rim with respect to the portion of the bladder wall, the bladder being comprised by an aircraft fuel system that further includes an aircraft fuel housing and a rigid interconnect extending from the housing to the rim, the interconnect being selected from among a fuel line, a fill port, an access port, a vent, and a cell leveling port.

16. A storage container comprising:
   a container wall configured to retain a fluid within the container;
   an orifice through a portion of the container wall;
   a plurality of resilient, concentric corrugations in the portion of the container wall adjacent the orifice, individual corrugations continuously surrounding the orifice; and
   a planar section of the portion of the container wall surrounding the plurality of corrugations and being substantially co-planar with the orifice, the plurality of corrugations exhibiting the property of allowing translational movement of the orifice with respect to the planar section of the portion of the container wall and the plurality of corrugations extending radially from adjacent the orifice to the planar section of the portion of the container wall.

17. The container of claim 16 wherein the container is a bladder and the bladder is configured to retain a liquid aircraft fuel within the bladder.

18. The container of claim 16 wherein the container is comprised by an aircraft fuel system.

19. The container of claim 16 wherein the corrugations are circular.

20. The container of claim 16 wherein the corrugations exhibit a surface length along a radius from a center of the orifice that is greater than their aerial length along the radius.

21. An aircraft fuel system comprising an aircraft fuel housing, a fuel bladder inside the housing, and a rigid interconnect extending from the housing to the bladder, the bladder including:
   a bladder wall configured to retain fuel within the bladder, the housing having an interior profile and the bladder wall being configured to correspond with the interior profile;
   an opening through the bladder wall;
   a rim of the bladder wall surrounding the opening;
   an interconnect mount attached to the rim, the mount in turn attaching the interconnect to the bladder;
   at least one resilient, ring-shaped corrugation in the bladder wall adjacent to and continuously surrounding the rim; and
   a portion of the bladder wall surrounding the corrugation and being substantially co-planar with the opening when no force is applied to the rim, the corrugation exhibiting the property of allowing movement of the rim with respect to the surrounding portion of the bladder wall and the at least one corrugation extending radially from the rim to the portion of the bladder wall.

22. The system of claim 21 wherein the mount is a circular ring.

23. The system of claim 21 wherein the at least one resilient corrugation comprises a plurality of concentric corrugations.

24. The system of claim 21 wherein the interconnect is axially aligned with the opening, the interconnect extending orthogonally from the opening, and wherein the entire fuel bladder is configured to correspond with the interior profile.

* * * * *

UNITED STATES PATENT AND TRADEMARK OFFICE
CERTIFICATE OF CORRECTION

PATENT NO. : 9,352,845 B1
APPLICATION NO. : 13/370129
DATED : May 31, 2016
INVENTOR(S) : Jeremie J. Albert et al.

It is certified that error appears in the above-identified patent and that said Letters Patent is hereby corrected as shown below:

In the Claims

Claim 10 should read

10. The bladder of claim 5 further comprising a ring-shaped interconnect mount attached to the rim, the mount being configured to attach an interconnect to the bladder wall.

Signed and Sealed this
Ninth Day of August, 2016

Michelle K. Lee
*Director of the United States Patent and Trademark Office*